(12) United States Patent
Doyle

(10) Patent No.: US 8,479,354 B1
(45) Date of Patent: Jul. 9, 2013

(54) DRILL BRUSH AND VACUUM ATTACHMENT APPARATUS

(76) Inventor: Peter T. Doyle, Bellingham, MA (US)

( * ) Notice: Subject to any disclaimer, the term of this patent is extended or adjusted under 35 U.S.C. 154(b) by 413 days.

(21) Appl. No.: 12/948,077

(22) Filed: Nov. 17, 2010

(51) Int. Cl.
*A47L 5/10* (2006.01)
*A47L 7/00* (2006.01)

(52) U.S. Cl.
USPC ............ 15/339; 15/383; 15/385; 30/500; 173/198

(58) Field of Classification Search
USPC ............ 15/339, 344, 383, 385; 30/133, 500; 173/198; 408/67
IPC .................................. A47L 7/00,5/10
See application file for complete search history.

(56) References Cited

U.S. PATENT DOCUMENTS

| 3,837,383 A | | 9/1974 | Ko |
| 5,224,231 A | | 7/1993 | Nacar |
| 5,608,941 A | * | 3/1997 | Kleinfeld .................... 15/179 |
| 5,988,954 A | | 11/1999 | Gaskin et al. |
| 6,086,292 A | * | 7/2000 | Yokoyama ..................... 408/67 |
| 6,719,072 B2 | * | 4/2004 | Bongers-Ambrosius et al. ......................... 175/213 |
| 2005/0000052 A1 | | 1/2005 | Byles |
| 2007/0193759 A1 | * | 8/2007 | Sweig et al. ................. 173/198 |

* cited by examiner

*Primary Examiner* — David Redding

(57) ABSTRACT

The drill brush and vacuum attachment apparatus provides for attachment to a vacuum cleaner and to a drill. The diameter reduction of the shaft first end is removably chucked into a drill of choice. The drill thereby turns the shaft as the free-wheel sleeve is free to be held stationary by a user via the angled reaction bar. The bar with associated collar may adjustably positioned along the sleeve, then tightened in the desired position by the thumb screw. Various shapes and sizes of removable brushes and other tools may be threadably attached to the shaft second end and used to clean various work pieces, and especially to clean out pre-drilled holes. As a work piece is cleaned by brushes and tools, the vacuum connected to the free-wheel sleeve vacuum tube draws debris and potentially airborne materials in, thereby negating potential mess, material clouds, and ensures a healthy work place.

9 Claims, 5 Drawing Sheets

DRILL BRUSH AND VACUUM ATTACHMENT APPARATUS

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Drilled holes in a variety of materials benefit or even require cleanout in order to be useful. This is especially true, for example, with holes drilled in cementitious material. In order for anchors such as mechanical anchors and catalyzed glues and polymers to be used in the holes, they must first be cleaned. If the holes are simply sprayed with air for cleaning, the materials scattered into the air are visually invasive and can also be a health hazard. The present apparatus provides a means for a drill and vacuum to be used in cleaning out pre-drilled holes.

FIELD OF THE INVENTION

The drill brush and vacuum attachment apparatus relates to drilling tools and more especially to an apparatus that attaches to a drilling tool and vacuum and provides for cleaning a pre-drilled hole and at the same time vacuuming any debris and potential airborne particles from the hole.

SUMMARY OF THE INVENTION

The general purpose of the drill brush and vacuum attachment apparatus, described subsequently in greater detail, is to provide a drill brush and vacuum attachment apparatus which has many novel features that result in an improved drill brush and vacuum attachment apparatus which is not anticipated, rendered obvious, suggested, or even implied by prior art, either alone or in combination thereof.

To attain this, the drill brush and vacuum attachment apparatus provides for attachment to a vacuum cleaner and to a drill. The diameter reduction of the shaft first end is removably chucked into a drill of choice. The diameter reduction of the shaft may be round or hexagonal and may also be bladed, notched, or provided in shapes and lengths to fit various drill chucks. The drill thereby turns the shaft as the free-wheel sleeve is free to be held stationary by a user via the angled reaction bar. The bar may also be angled differently other than upward and may also be straight. The bar with associated collar may adjustably positioned along the sleeve, then tightened in the desired position by the thumb screw. The bar may also be provided in direct connection to the free-wheel sleeve without the collar. The sleeve may be in communication with the hollow shaft by a variety of ports, among those the preferred elongate port. Various shapes and sizes of removable brushes and other tools may be threadably attached to the shaft second end and used to clean various work pieces, and especially to clean out pre-drilled holes. As a work piece is cleaned by brushes and tools, the vacuum connected to the free-wheel sleeve vacuum tube draws debris and potentially airborne materials in, thereby negating potential mess, material clouds, and ensures a healthy work place. Thus has been broadly outlined the more important features of the improved drill brush and vacuum attachment apparatus so that the detailed description thereof that follows may be better understood and in order that the present contribution to the art may be better appreciated.

An object of the drill brush and vacuum attachment apparatus is to clean out pre-drilled holes.

Another object of the drill brush and vacuum attachment apparatus is to prevent scattering debris from the hole.

A further object of the drill brush and vacuum attachment apparatus is to prevent scattering airborne particles.

An added object of the drill brush and vacuum attachment apparatus is to utilize an existing drill and an existing vacuum.

And, an object of the drill brush and vacuum attachment apparatus is to provide for removable brush replacement.

Yet another object of the drill brush and vacuum attachment apparatus is to prevent OSHA violations.

These together with additional objects, features and advantages of the improved drill brush and vacuum attachment apparatus will be readily apparent to those of ordinary skill in the art upon reading the following detailed description of presently preferred, but nonetheless illustrative, embodiments of the improved drill brush and vacuum attachment apparatus when taken in conjunction with the accompanying drawings.

DETAILED DESCRIPTION OF THE DRAWINGS

With reference now to the drawings, and in particular FIGS. 1 through 6 thereof, the principles and concepts of the drill brush and vacuum attachment apparatus generally designated by the reference number 10 will be described.

Figure 1:
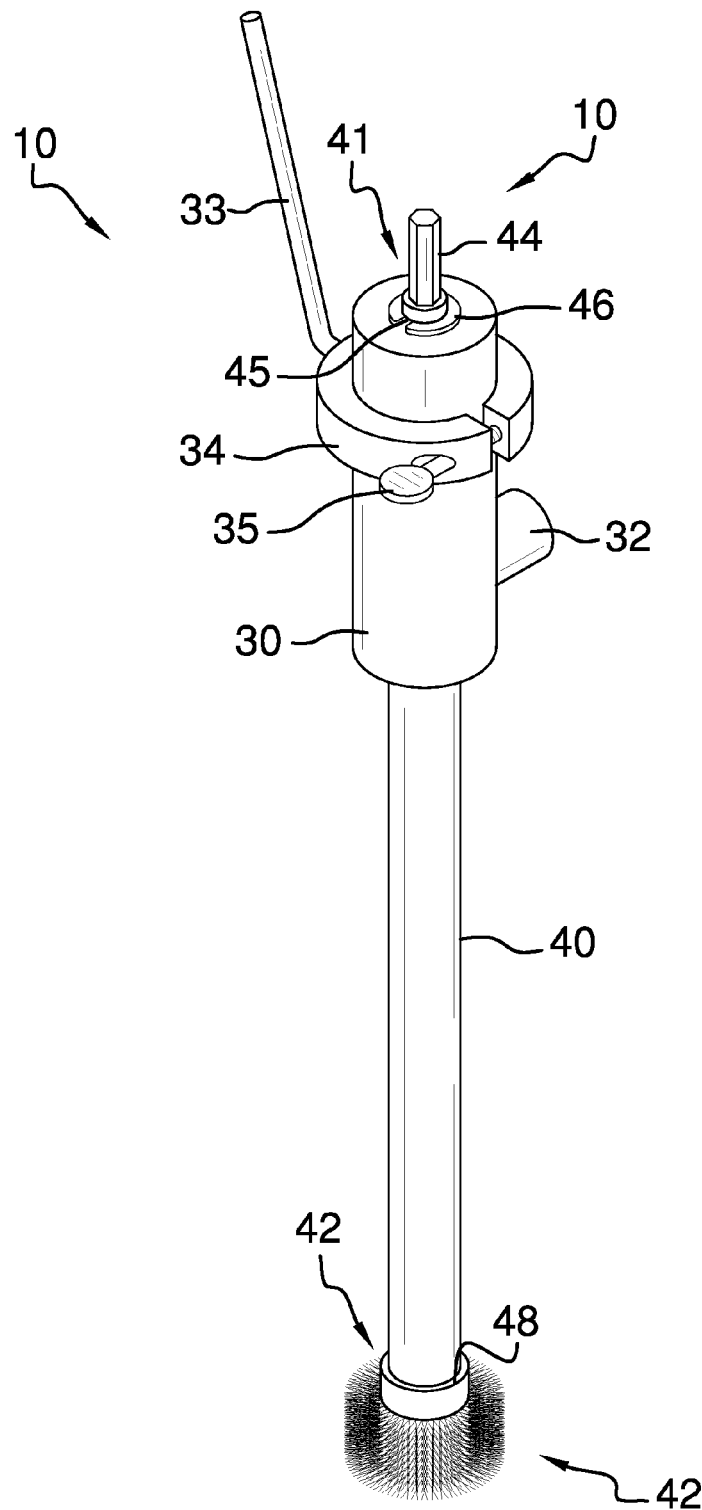
FIG. 1 is a perspective view.
Figure 2:
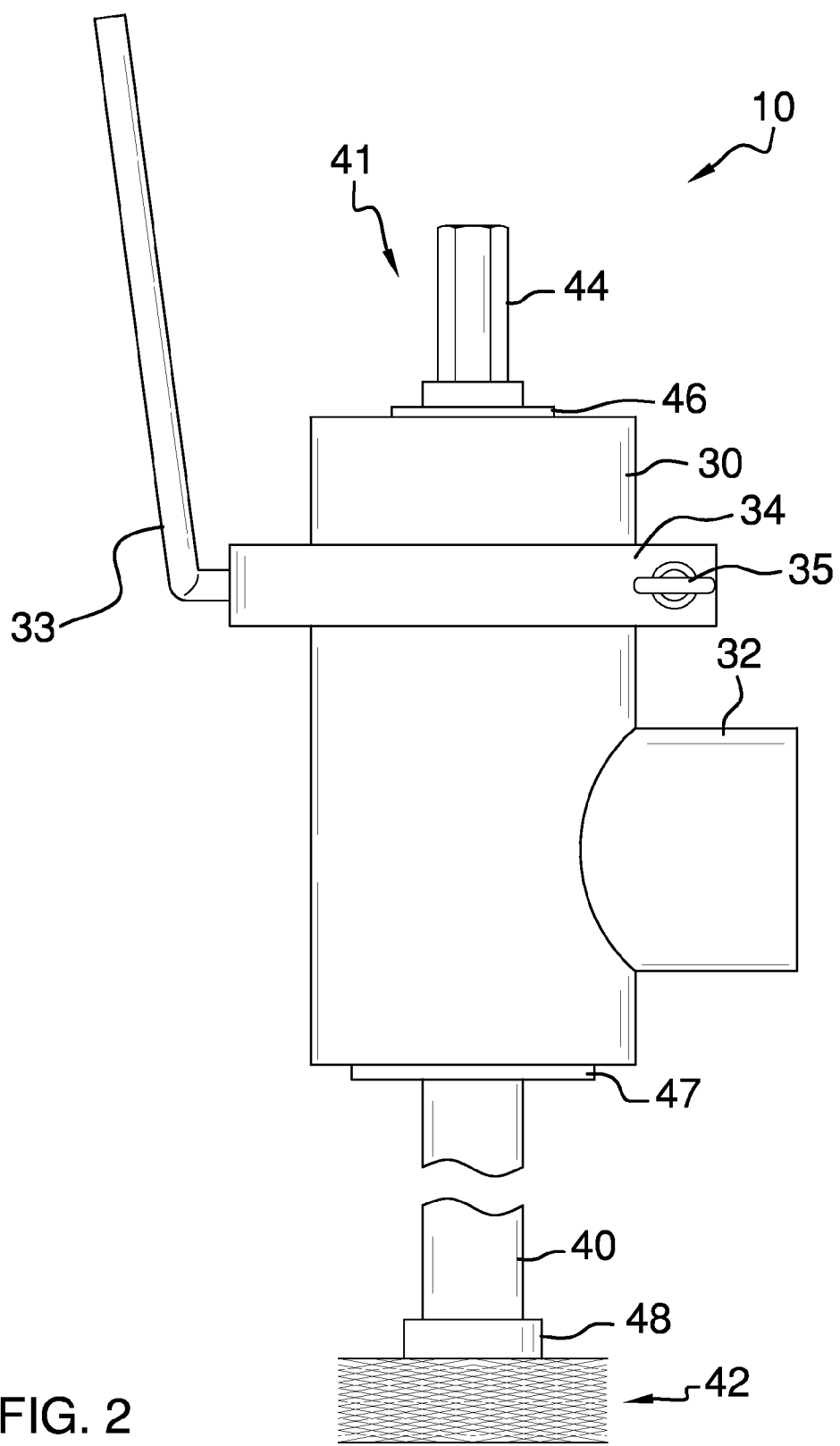
FIG. 2 is a lateral elevation view.

Referring to FIG. 2, the apparatus 10 is partially comprised of a cylindrical free-wheel sleeve 30. The clampable collar 34 is disposed around the sleeve 30. The thumb screw 35 is disposed tangentially within the collar 34. The collar 34 is selectively clamped and unclamped on the free-wheel sleeve 30 by the thumb screw 35.

Referring to FIG. 1 and again to FIG. 2, the angled reaction bar 33 is fitted outwardly and diametrically to the clampable collar 34.

Figure 5:
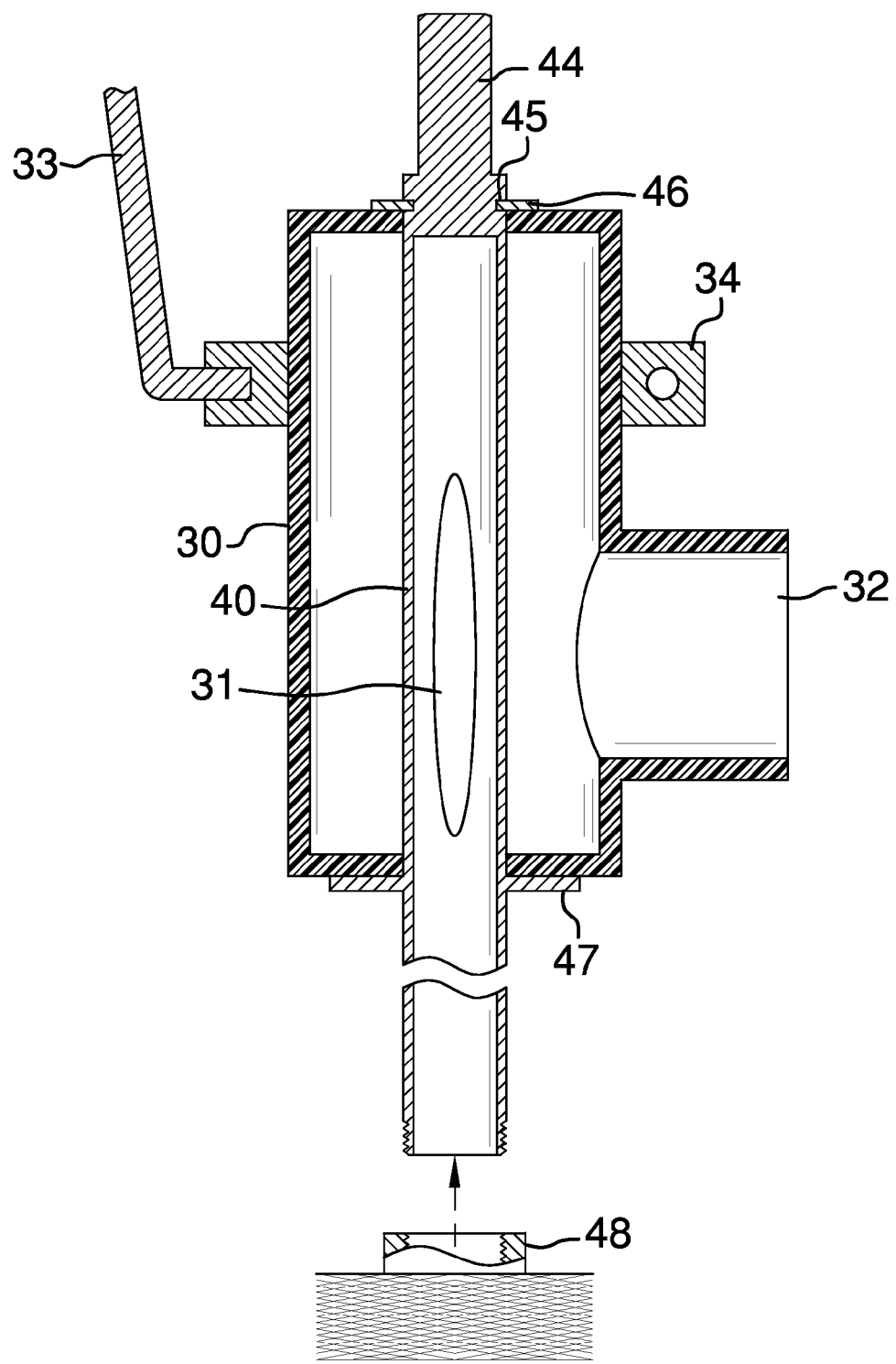
FIG. 5 is a cross sectional view of FIG. 3, taken along the line 3-3.

Referring to FIG. 5, the hollow shaft 40 has a first end 41 spaced apart from a second end 42. The hollow shaft 40 is rotateably fitted within the cylindrical free-wheel sleeve 30.

Figure 3:
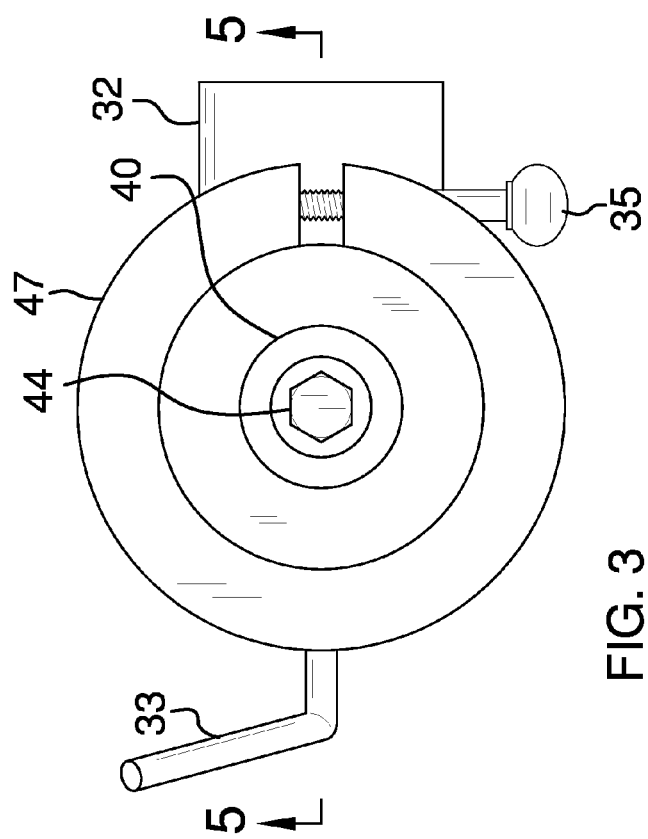
FIG. 3 is a top plan view.

Referring again to FIG. 2 and also to FIG. 3, the diameter reduction 44 is disposed at the first end 41.

Referring to FIG. 5, the groove 45 is disposed on the hollow shaft 40 proximal to the diameter reduction 44. The c-clip 46 is removably disposed within the groove 45. The c-clip 46 selectively retains the cylindrical free-wheel sleeve 30 upwardly on the hollow shaft 40. The stop collar 47 is disposed outwardly on the hollow shaft 40 and spaced apart from the groove 45. The free-wheel sleeve 30 is retained downwardly by the stop 47.

Figure 4:
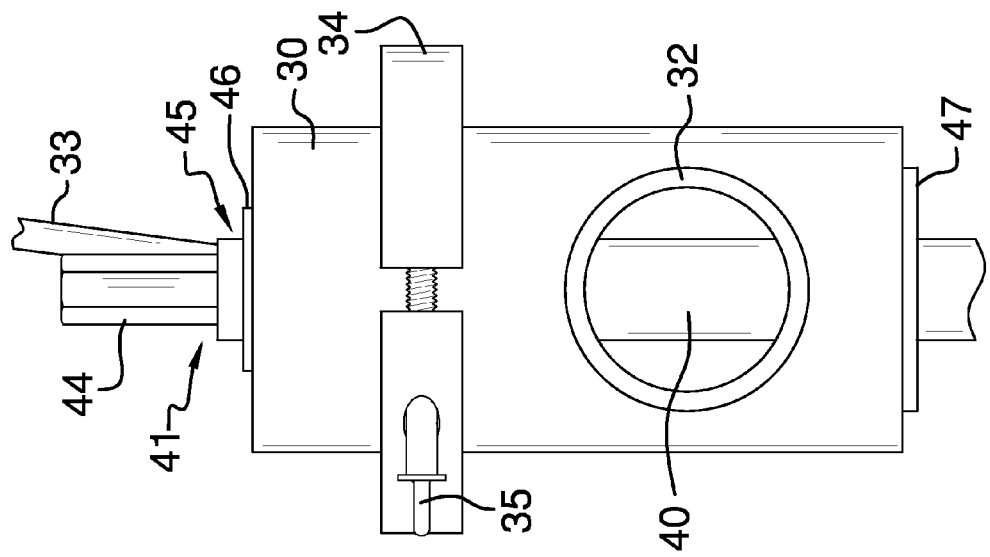
FIG. 4 is a partial lateral elevation view.

Referring to FIG. 3 and again to FIG. 4, the vacuum tube 32 is extended diametrically from the free-wheel sleeve 30.

Referring to FIG. 5, the elongate port 31 is disposed within the hollow shaft 40. The elongate port 31 is disposed in alignment with the free-wheel sleeve 30.

Figure 6:
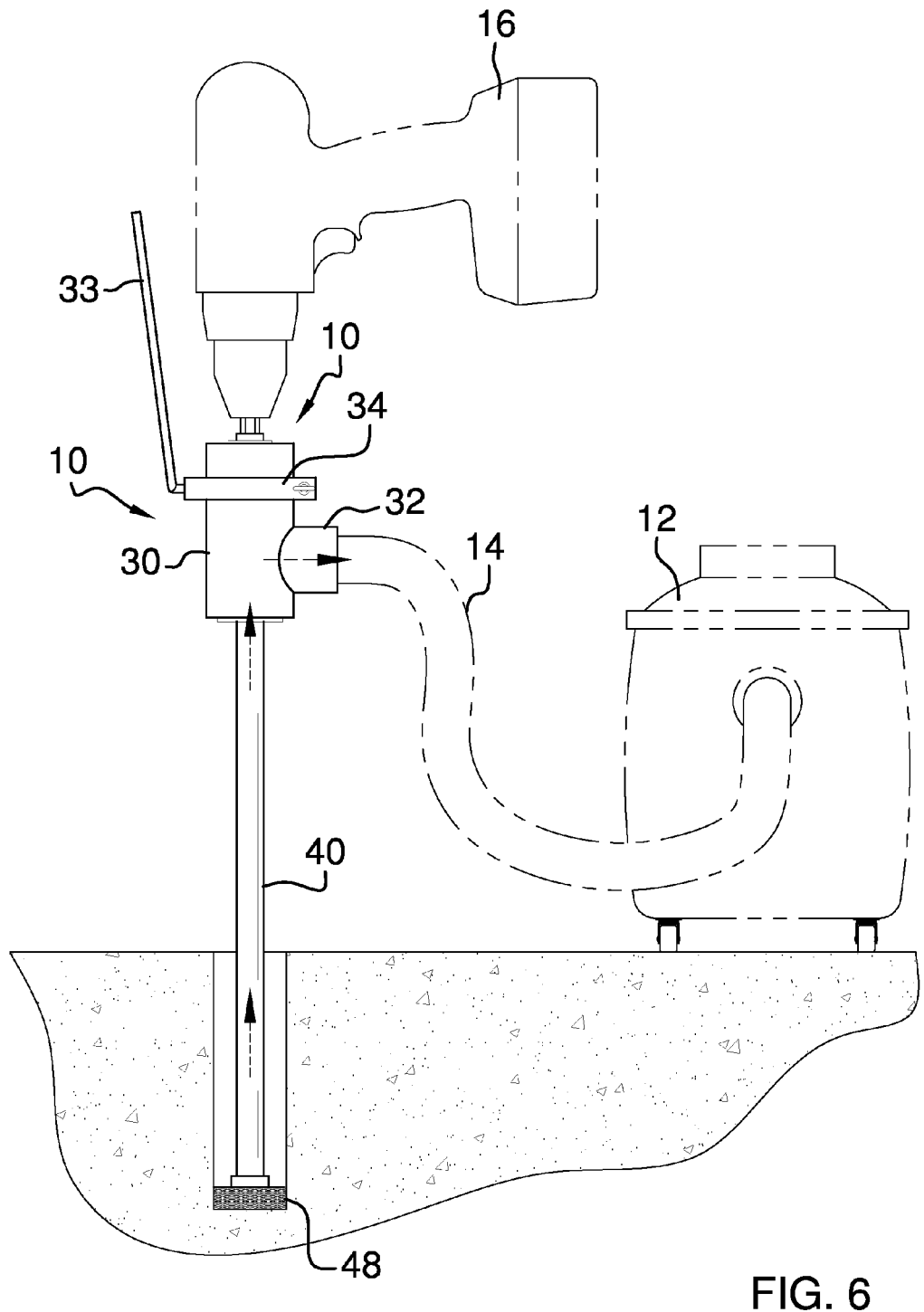
FIG. 6 is a lateral elevation view of the apparatus in use.

Referring to FIG. 6, a vacuum 12 with vacuum hose 14 is removably attached to the vacuum tube 32 and draws through the hollow shaft 40.

Referring to again to FIGS. 1 and 5, the removable circular brush 48 is threadably fitted to the hollow shaft 40 second end 42. The circular brush 48 is centrally open.

Referring again to FIG. 6, the circular brush 48 and part of the hollow shaft 40 have penetrated the pre-drilled hole. The vacuum draws through the vacuum port 32, the free-wheel sleeve 30, the hollow shaft 40, and the circular brush 48, and the circular brush 48 is turned by the drill 16 via the diameter reduction 44 driving the hollow shaft 40. The hole is thereby cleaned without any debris or airborne particles.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the drill brush and vacuum attachment apparatus may be used.

What is claimed is:

1. A drill brush and vacuum attachment apparatus comprising, in combination:
    a cylindrical free-wheel sleeve;
    a reaction bar fitted outwardly and diametrically to the free-wheel sleeve;
    a hollow shaft having a first end spaced apart from a second end, the hollow shaft rotateably fitted within the cylindrical free-wheel sleeve;
    a diameter reduction disposed at the first end;
    a groove disposed on the hollow shaft proximal to the diameter reduction;
    a c-clip removably disposed within the groove, the c-clip selectively retaining the cylindrical free-wheel sleeve upwardly on the hollow shaft
    a stop collar disposed outwardly on the hollow shaft and spaced apart from the groove, the free-wheel sleeve retained downwardly by the stop collar;
    a vacuum tube extended diametrically from the free-wheel sleeve;
    a port disposed within the hollow shaft, the port disposed in alignment with the free-wheel sleeve;
    whereby an existing vacuum attached to the vacuum tube draws through the hollow shaft;
    a brush fitted to the hollow shaft second end.

2. The apparatus according to claim 1 wherein the port disposed within the hollow shaft is further an elongate port.

3. The apparatus according to claim 1 wherein the brush is further threadably fitted to the hollow shaft second end.

4. The apparatus according to claim 2 wherein the brush is further threadably fitted to the hollow shaft second end.

5. The apparatus according to claim 1 wherein the reaction bar fitted to the free-wheel sleeve is further an angled reaction bar fitted outwardly, upwardly, and diametrically to the free-wheel sleeve.

6. The apparatus according to claim 2 wherein the reaction bar fitted to the free-wheel sleeve is further an angled reaction bar fitted outwardly, upwardly, and diametrically to the free-wheel sleeve.

7. The apparatus according to claim 3 wherein the reaction bar fitted to the free-wheel sleeve is further an angled reaction bar fitted outwardly, upwardly, and diametrically to the free-wheel sleeve.

8. The apparatus according to claim 4 wherein the reaction bar fitted to the free-wheel sleeve is further an angled reaction bar fitted outwardly, upwardly, and diametrically to the free-wheel sleeve.

9. A drill brush and vacuum attachment apparatus comprising, in combination:
    a cylindrical free-wheel sleeve;
    a clampable collar disposed around the sleeve;
    a thumb screw disposed tangentially within the collar, the collar selectively clamped and unclamped on the free-wheel sleeve by the thumb screw;
    an angled reaction bar fitted outwardly and diametrically to the clampable collar;
    a hollow shaft having a first end spaced apart from a second end, the hollow shaft rotateably fitted within the cylindrical free-wheel sleeve;
    a diameter reduction disposed at the first end;
    a groove disposed on the hollow shaft proximal to the diameter reduction;
    a c-clip removably disposed within the groove, the c-clip selectively retaining the cylindrical free-wheel sleeve upwardly on the hollow shaft
    a stop collar disposed outwardly on the hollow shaft and spaced apart from the groove, the free-wheel sleeve retained downwardly by the stop collar;
    a vacuum tube extended diametrically from the free-wheel sleeve;
    an elongate port disposed within the hollow shaft, the elongate port disposed in alignment with the free-wheel sleeve;
    whereby a vacuum attached to the vacuum tube draws through the hollow shaft;
    a removable circular brush threadably fitted to the hollow shaft second end.

* * * * *